(12) United States Patent
Santin

(10) Patent No.: US 11,732,670 B2
(45) Date of Patent: Aug. 22, 2023

(54) SYSTEM AND METHOD FOR ON-LINE RECALIBRATION OF CONTROL SYSTEMS

(71) Applicant: Garrett Transportation I Inc., Torrance, CA (US)

(72) Inventor: Ondrej Santin, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/525,666

(22) Filed: Nov. 12, 2021

(65) Prior Publication Data

US 2023/0151776 A1    May 18, 2023

(51) Int. Cl.
| F02D 41/24 | (2006.01) |
| F02B 37/16 | (2006.01) |
| F02B 37/22 | (2006.01) |
| F02B 39/10 | (2006.01) |

(52) U.S. Cl.
CPC .......... *F02D 41/2438* (2013.01); *F02B 37/16* (2013.01); *F02B 37/22* (2013.01); *F02B 39/10* (2013.01); *F02D 2200/101* (2013.01)

(58) Field of Classification Search
CPC ............. F02D 41/2438; F02D 41/1401; F02D 2041/1433; F02D 2041/1412; F02D 2200/101
See application file for complete search history.

(56) References Cited

U.S. PATENT DOCUMENTS

| 4,046,003 | A  | 9/1977  | Armstrong et al. |
| 5,968,107 | A  | 10/1999 | Vogan et al. |
| 6,298,718 | B1 | 10/2001 | Wang |
| 6,637,205 | B1 | 10/2003 | Ahmad et al. |
| 7,143,580 | B2 | 12/2006 | Ge |
| 7,296,562 | B2 | 11/2007 | Withrow et al. |
| 7,631,498 | B2 | 12/2009 | Greentree |
| 8,146,358 | B2 | 4/2012  | Greentree |
| 8,850,878 | B2 | 10/2014 | Flynn et al. |

(Continued)

FOREIGN PATENT DOCUMENTS

| EP | 1686252 A1 | 8/2006 |
| EP | 2489851 A1 | 8/2012 |
| EP | 3258089 A1 | 12/2017 |

OTHER PUBLICATIONS

Hriadel, "Health Status Monitoring of Turbocharger for Passenger Vehicle Applications," Czech Technical University in Prague, 92 pages, Jan. 2019.

(Continued)

*Primary Examiner* — Ngoc T Nguyen
(74) *Attorney, Agent, or Firm* — Seager, Tufte & Wickhem, LLP

(57) ABSTRACT

Methods and systems for controlling a system such as an engine having an airflow system. A model predictive control calculation is configured in an off-line mode, having a linear part and a non-linear part. In an on-line mode, the linear part of the MPC and/or a Hessian matrix used with the MPC is modified responsive to special modes or other operating changes or conditions. The online mode is configured to respond to changing modes or conditions without requiring recalculation of the MPC. Certain changes of conditions and modes are used to modify feedforward, while others modify responsiveness.

20 Claims, 10 Drawing Sheets

(56) References Cited

U.S. PATENT DOCUMENTS

| | | |
|---|---|---|
| 9,014,918 B2 | 4/2015 | Hagen et al. |
| 9,789,756 B2 | 10/2017 | Schwartz et al. |
| 10,156,197 B1 | 12/2018 | Jin et al. |
| 2007/0079613 A1 | 4/2007 | Greentree |
| 2009/0000298 A1 | 1/2009 | Barthlet |
| 2009/0013687 A1 | 1/2009 | Swenson et al. |
| 2009/0266073 A1 | 10/2009 | Greentree |
| 2010/0292937 A1 | 11/2010 | Hosny et al. |
| 2012/0245789 A1 | 9/2012 | Ghoneim |
| 2013/0067915 A1 | 3/2013 | Flynn et al. |
| 2014/0107885 A1 | 4/2014 | Hagen et al. |
| 2015/0083096 A1 | 3/2015 | Zagone et al. |
| 2016/0076438 A1 | 3/2016 | Tabata et al. |
| 2016/0117427 A1 | 4/2016 | Lindgärde et al. |
| 2016/0265468 A1 | 9/2016 | Takayanagi et al. |
| 2017/0044971 A1 | 2/2017 | Racca |
| 2017/0096952 A1 | 4/2017 | Yu et al. |
| 2017/0152799 A1 | 6/2017 | Lee et al. |
| 2017/0370371 A1 | 12/2017 | Banker et al. |
| 2018/0051638 A1 | 2/2018 | Wang et al. |
| 2018/0106202 A1 | 4/2018 | Dickson et al. |
| 2019/0226389 A1 | 7/2019 | Byrd et al. |
| 2019/0377307 A1 | 12/2019 | Santin |
| 2019/0385385 A1 | 12/2019 | Davidson |
| 2019/0385386 A1 | 12/2019 | Davidson |
| 2019/0385387 A1 | 12/2019 | Davidson |
| 2020/0156675 A1 | 5/2020 | Magnus et al. |
| 2023/0038827 A1* | 2/2023 | Baramov ............... F01D 17/06 |

OTHER PUBLICATIONS

European Extended Search Report for EP Application No. 21185442.7 dated Jan. 12, 2022, 9 pages.

Extended European Search Report for EP Application No. 22188560.1 dated Apr. 28, 2023, 10 pages.

\* cited by examiner

SYSTEM AND METHOD FOR ON-LINE RECALIBRATION OF CONTROL SYSTEMS

BACKGROUND

Engine airpath control management presents various non-linear control problems with a plurality of cross-interactions, system limitations, and changing demands. Addition of various features to the engine airpath has allowed for improved engine efficiency with reduced emissions. However, each added feature increases the complexity of the control problem. For example, prior control systems may configure a set of simple proportional-integral-derivative (PID) control solutions, each directed to one or more components of the system. As engine systems become more complex, however, tuning the PID control solutions robustly to account for both the underlying system complexity and the need to meet more and more stringent emissions limits has become challenging. Such challenges increase the time spent on test cells and vehicles for performing strategy calibration.

Advanced control methods have been introduced more recently to resolve the tuning and calibration challenges, such as model predictive control (MPC). MPC is an optimization-based control solution, wherein the control problem is transformed into a cost function operating within a set of constraints, which is then solved for each sampling interval. Full MPC, however, relies on significant computation complexity for nonlinear control solutions. To reduce the computational complexity, the control problem can be transformed into a set of switched linear MPC problems, where each linear MPC is based on a localized linear model. Each such local MPC approximates a controller operating proximate to a linearization point, such as a steady state.

However, when a calibration change is needed, the set of switched linear MPCs must typically be recalibrated all together, consuming significant time and resources in the process. New and alternative systems and methods for handling changes to the calibration the control solution are desired.

Overview

The present inventors have recognized, among other things, that a problem to be solved is the need for new and/or alternative ways to recalibrate a non-linear control problem that has been broken into a plurality of sub-parts. The proposed solution solves the above problem by a combination of model formulation, treating the system to control as an integrator needing a single linear MPC is required (though multiple such MPCs may be used if desired). When a change in calibration is needed, the structure of the optimization problem can be left unchanged, instead updating the calibration of the optimization problem. The approach avoids rebuilding the model, and allows a fixed problem structure and reduces memory requirements, while also reducing cycle time for the new calibration experiments. The linear MPC problem may be constructed off-line for a given model and calibration weights in the cost functions. The fixed structure facilitates quadratic programming (QP) with fixed data, that can be stored and only loaded during the run-time on ECU and solved by the QP solver. The proposed solution adds an additional step prior to QP solving in which the problem data is modified with new calibration using linear complexity. Such new calibrations can be changed easily by the calibration engineer or by external functions driven by logic operated outside the MPC.

A first illustrative and non-limiting example takes the form of a method of operating a system comprising applying a model predictive control (MPC) calculation to determine control metrics for one or more operable devices in the system; determining a change in an input to the system; modifying one or more coefficients of the MPC calculation in response to the change in the input to the system; and re-applying the MPC calculation using the modified coefficients and issuing control commands to the one or more operable devices in the system therefrom.

Additionally or alternatively, the step of modifying one or more coefficients of the MPC calculation in response to the change in the input to the system excludes reconstructing the MPC itself.

Additionally or alternatively, the MPC calculation uses a Hessian matrix and a cost function, and step of modifying one or more coefficients of the MPC calculation in response to the change in the input to the system is performed by modifying only the Hessian matrix and the coefficients of the cost function.

Additionally or alternatively, the cost function comprises a non-linear part and a linear part, and the step of modifying the coefficients of the cost function is performed by modifying only the coefficients of the linear part of the cost function.

Additionally or alternatively, the MPC calculation is formulated off-line, while the applying, determining, modifying and re-applying steps are performed on-line as the system is operating.

Additionally or alternatively, the system is an engine having an airflow system, comprising: an engine having an intake manifold and an exhaust manifold; a turbocharger having a compressor for compressing air entering the intake manifold using at least power obtained from exhaust gasses exiting the exhaust manifold; a turbocharger power control device (TPCD) configured to manipulate power delivered by the exhaust gasses to the turbocharger; and an E-Turbo motor configured to selectively apply torque to the turbocharger; wherein the control metrics are applied to control position of the TPCD, and the amount of torque applied by the E-Turbo motor.

Additionally or alternatively, the system comprises a recirculation valve (RCV) to allow recirculation of compressed air from the compressor to the compressor intake; and the step of determining a change in an input to the system comprises identifying a change in RCV position.

Additionally or alternatively, the compressor is a variable intake compressor (VIC), and the step of determining a change in an input to the system comprises identifying a change in VIC position.

Additionally or alternatively, the system comprises an exhaust temperature sensor, and the step of determining a change in an input to the system comprises identifying a change in exhaust temperature.

Additionally or alternatively, the system is configured to determine current engine speed and an engine speed command, and the step of determining a change in an input to the system comprises identifying a difference between the current engine speed and the engine speed command.

Additionally or alternatively, the MPC calculation is performed in a power domain by: taking as an input a desired boost pressure; converting the desired boost pressure to a desired turbocharger speed, and then to desired kinetic energy of the turbocharger; and determining from the desired kinetic energy of the turbocharger a desired exhaust gas power and a desired E-Turbo torque.

Additionally or alternatively, the system comprises a recirculation valve (RCV) to allow recirculation of compressed air from the compressor to the compressor intake; the compressor is a variable intake compressor (VIC); and the MPC calculation is performed in a power domain by: taking as an input a desired boost pressure; converting the desired boost pressure to a desired turbocharger speed, and then to desired kinetic energy of the turbocharger; and determining from the desired kinetic energy of the turbocharger each of: a desired exhaust gas power; a desired E-Turbo torque; a desired RCV position; and a desired VIC position.

Additionally or alternatively, modifying one or more coefficients of the MPC calculation in response to the change in the input to the system comprises: applying a first coefficient to adjust feedforward attraction of the MPC calculation; and applying a second coefficient to adjust a rate of change of the control metrics for the TPCD, the E-Turbo torque, the RCV position, and the VIC position.

Another illustrative and non-limiting example takes the form of a method of operating a system comprising: in an off-line mode, calculating a model predictive control calculation for operation of the system; in an on-line mode: applying the MPC calculation to determine control metrics for one or more operable devices in the system by use of at least one first coefficient affecting a feedforward attraction of the MPC calculation; determining a change in an input to the system; modifying the at least one first coefficient in response to the change in the input to the system; and re-applying the MPC calculation using the modified at least one first coefficient and issuing control commands to the one or more operable devices in the system therefrom.

Additionally or alternatively, the on-line mode modifies the at least one first coefficient without recalculating the MPC calculation.

Additionally or alternatively, the system is an engine having an airflow system, comprising: an engine having an intake manifold and an exhaust manifold; a turbocharger having a compressor for compressing air entering the intake manifold using at least power obtained from exhaust gasses exiting the exhaust manifold; a turbocharger power control device (TPCD) configured to manipulate power delivered by the exhaust gasses to the turbocharger; and an E-Turbo motor configured to selectively apply torque to the turbocharger; wherein the control metrics are applied to control position of the TPCD, and the amount of torque applied by the E-Turbo motor.

Additionally or alternatively, the system further comprises a recirculation valve (RCV), and determining a change in an input to the system comprises identifying a change in RCV position and the controller is configured to modify the first coefficient in response thereto.

Additionally or alternatively, the system comprises an exhaust gas temperature sensor and the controller defines a normal range of exhaust gas temperatures, wherein the controller is configured to identify a change in an input to the system as an indication of out of normal range exhaust gas temperature.

Additionally or alternatively, the system includes an intake manifold pressure sensor and the controller defines a normal range of intake manifold pressures, wherein the controller is configured to identify an indication of an out-of-normal range intake manifold pressure as a change in an input to the system.

Another illustrative and non-limiting example takes the form of a method of operating a system comprising: applying a model predictive control (MPC) calculation to determine control metrics for one or more operable devices in the system by use of at least one first coefficient affecting a speed of responsiveness of the MPC; determining a change in an input to the system; modifying the at least one first coefficient in response to the change in the input to the system; and re-applying the MPC calculation using the modified at least one first coefficient and issuing control commands to the one or more operable devices in the system therefrom; wherein the system is an engine having an airflow system, comprising: an engine having an intake manifold and an exhaust manifold; a turbocharger having a compressor for compressing air entering the intake manifold using at least power obtained from exhaust gasses exiting the exhaust manifold; a turbocharger power control device (TPCD) configured to manipulate power delivered by the exhaust gasses to the turbocharger; and an E-Turbo motor configured to selectively apply torque to the turbocharger; wherein the control metrics are applied to control position of the TPCD, and the amount of torque applied by the E-Turbo motor.

Additionally or alternatively, the turbocharger further includes an E-Turbo motor configured to apply torque to the turbocharger shaft, and the control metrics are applied to also control torque generated by the E-Turbo motor.

Additionally or alternatively, the controller is configured to treat a change in engine speed as a system change and the method comprises modifying the first coefficient in response thereto.

Additionally or alternatively, the controller is configured to treat a change in torque demand on the engine as a system change and to modify the first coefficient in response thereto.

Additionally or alternatively, the engine airflow system further includes an exhaust gas recirculation (EGR) valve; further wherein the controller is configured to treat a change in position of the EGR valve as a system change and to modify the first coefficient in response thereto.

Still another set of illustrative and non-limiting examples take the form of a system comprising: an engine having an intake manifold and an exhaust manifold; a turbocharger having a compressor for compressing air entering the intake manifold using at least power obtained from exhaust gasses exiting the exhaust manifold; a turbocharger power control device (TPCD) configured to manipulate power delivered by the exhaust gasses to the turbocharger; and an E-Turbo motor configured to selectively apply torque to the turbocharger; wherein the control metrics are applied to control position of the TPCD, and the amount of torque applied by the E-Turbo motor. And an engine control unit (ECU) for controlling operation of the internal combustion engine and the turbocharger; wherein the ECU configured to perform a method as in any of the preceding method examples.

Additionally or alternatively, the system may further include a recirculation valve (RCV) to allow recirculation of compressed air from the compressor to the compressor intake; wherein the controller is configured to treat a change in position of the RCV as a system change; further wherein the controller is configured to modify a coefficient in the MPC calculation that affects responsiveness based on the change in position of the RCV.

Additionally or alternatively, the controller is configured to treat a change in position of the TPCD as a system change; further wherein the controller is configured to modify a coefficient in the MPC calculation that affects responsiveness based on the change in position of the TPCD.

Additionally or alternatively, the system further comprises an exhaust gas recirculation valve (EGR), the EGR being one of a high pressure or low pressure EGR, wherein the controller is configured to treat a change in position of the EGR as a system change further wherein the controller is configured to modify a coefficient in the MPC calculation that affects responsiveness based on the change in position of the EGR.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

Figure 1:
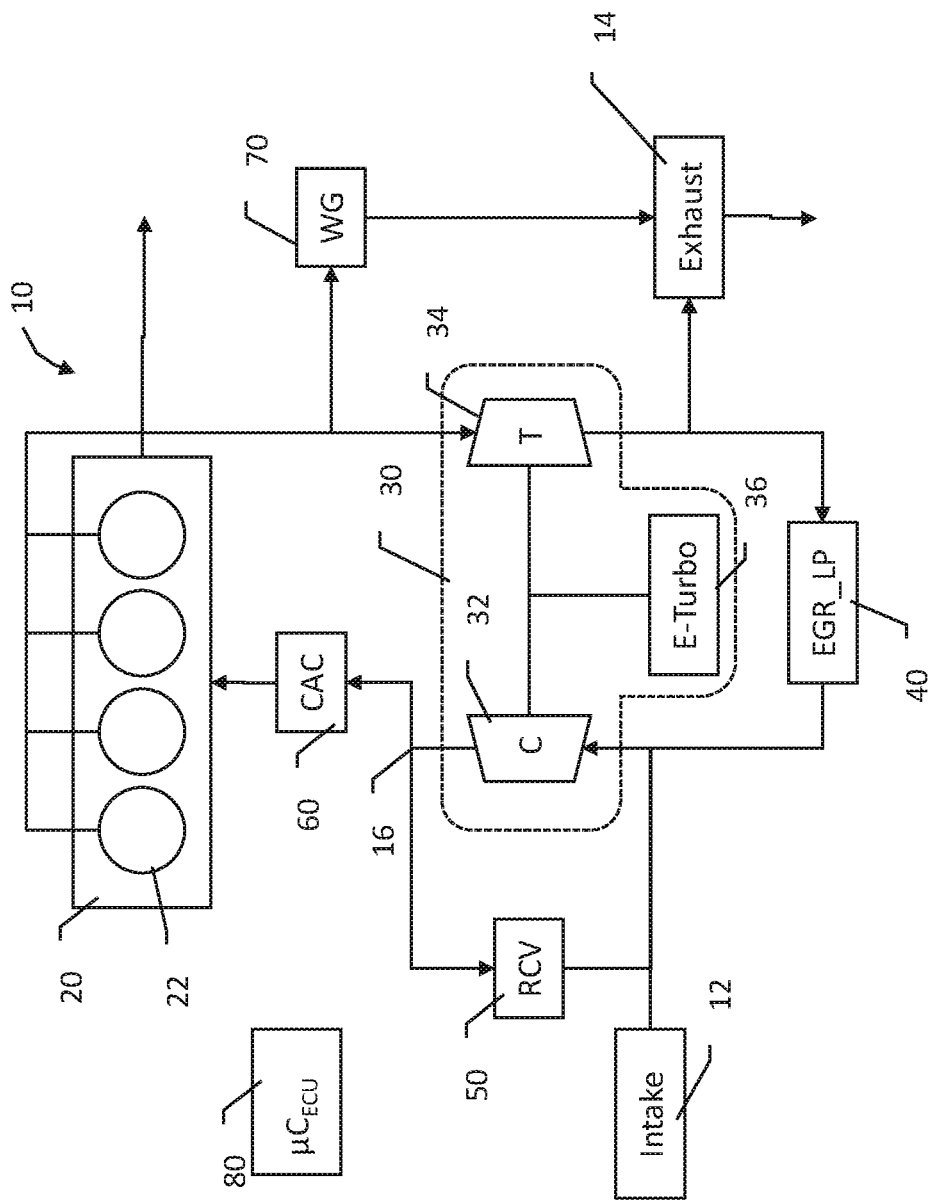
FIG. 1 shows an illustrative engine with a turbocharger.

FIG. 1 shows an illustrative engine with a turbocharger (optionally) including an electric motor to augment its operation. The overall system is shown at 10, with an engine at 20 having a plurality of cylinders 22. Though not designated in the drawing, the engine 20 will have an intake manifold for receiving incoming air flow, and an exhaust manifold for release of exhaust gas after combustion, as well as fuel injectors that inject a quantity of fuel to the cylinders for combustion as is known in the art. Air going into the engine is received from an intake 12, which may include an air filter and one or more sensors (for example, pressure, temperature, and mass air flow (MAF) sensors) for sensing incoming air conditions and quantifying the amount of incoming air flow and characteristics thereof. Intake air flows to a compressor 32 as part of a turbocharger 30, which compresses the air to an increased pressure to improve power and efficiency of the engine. The pressure at the output of the compressor 32, at position 16, is called the boost pressure. A charge air cooler (CAC) is shown at 60 for reducing the temperature of the air coming out of the compressor 32. The compressed and cooled air is fed to the intake manifold of the engine 20 through a throttle (not shown), such as an adjustable choke valve (ACV). Compressing the air going to the intake manifold of the engine 20 may, for example and dependent on other conditions, improve one or more of power and efficiency.

A recirculation valve (RCV) 50 can be provided to release compressed air downstream of the compressor 32 back to its input, and may be opened, for example, when the throttle is closed to prevent compressor surge (reverse airflow through the compressor, which can cause damage and other problems), as needed. The compressor 32 is shown as part of a turbocharger 30, which also includes a turbine 34 placed in the exhaust gas airstream coming out of the engine 20. The turbine 34 uses the exhaust gas pressure to spin, and is connected via a turbocharger shaft to the compressor 32. A wastegate (WG) 70 is provided allow exhaust gasses to bypass the turbine 34, allowing turbocharger 30 speed to be controlled. As used herein, "turbocharger speed" refers to the speed at which the compressor 32, shaft, and turbine 34 spin.

A low-pressure exhaust gas recirculation (EGR_LP) valve is also shown at 40, which controllably recirculates exhaust gas back to the intake of the compressor 32. While not shown, certain exhaust gas filters may be provided in line with the EGR_LP 40, as well as a heat exchanger, to reduce any particulates and cool air going back to the compressor 32. The recirculated exhaust gasses may be mostly inert to the combustion process, and may aid in reducing pumping losses, engine knock, and pollutant generation. Exhaust gasses that are not recirculated pass out to the exhaust 14, wherein environmental controls (catalytic converter, particulate trap, etc.) are applied. The exhaust 14 may also may be monitored by one or more sensors to analyze exhaust gas composition, such as a universal exhaust gas oxygen monitor (UEGO).

In the example shown, the turbocharger 30 includes an E-Turbo 36 configured to use electricity to apply torque to the drive shaft between the turbine 34 and the compressor 32. At low engine speeds, and without the E-Turbo 36, when a demand for increased power is received, the compressor 32 cannot provide the needed extra boost pressure because exhaust gas pressures cannot sufficiently drive the turbine 34. Under such conditions, air pressure at the engine intake manifold will remain relatively low until the engine speed increases, delaying response to the requested increase in power, a phenomenon known as turbocharger lag. With an E-Turbo 36, when a demand for power is received with the engine operating at a relatively low speed, torque may be applied to the turbocharger 30 drive shaft to supply added power to the compressor 32, increasing boost pressure and reducing turbocharger lag.

The various valves and components shown may have a variety of actuators to control positions thereof, such as controlling WG, RCV, or VIC position, turbine geometry, EGR_LP valve opening, and throttle (not shown) position. An engine control unit (ECU) is provided at 80 and controls overall operations via various connections (not shown) to actuators, valves, sensors and other components throughout the system. Some examples may include a separate E-Turbo controller communicatively connected to the ECU 80. Other power and control topologies may be used.

The combination of features shown is illustrative, and other combinations may be used. The layout shown may be for a gasoline engine, for example. Some examples herein may instead be for a diesel engine, in which case a high pressure EGR valve (EGR_HP) may be used to recirculate exhaust gasses from the engine 20 exhaust manifold directly back to the engine intake manifold, in addition to or instead of the EGR_LP 40 that is shown. A variable geometry turbine (VGT) may be used in some examples, and, if so, the WG 70 may be omitted, with the system instead relying on the VGT to control turbocharger 30 speed by modifying power received in the turbine. As used herein, a WG or a VGT may be described as a turbocharger power control device (TPCD).

The compressor 32 may, in some examples, be a fixed intake compressor or may, in other examples, be a variable intake compressor (VIC) as desired; if a VIC is used, the position of the compressor vanes may thus be adjustable. A blow-off valve may be used instead of an RCV, allowing compressed air to vent to the atmosphere rather than recirculating. However, it should be understood that examples herein may be used with any of gasoline, diesel, or other combustible fuel, with or without any of VGT, VIC, EGR_LP, WG, RCV, or EGR_HP, in any combination.

Figure 7:
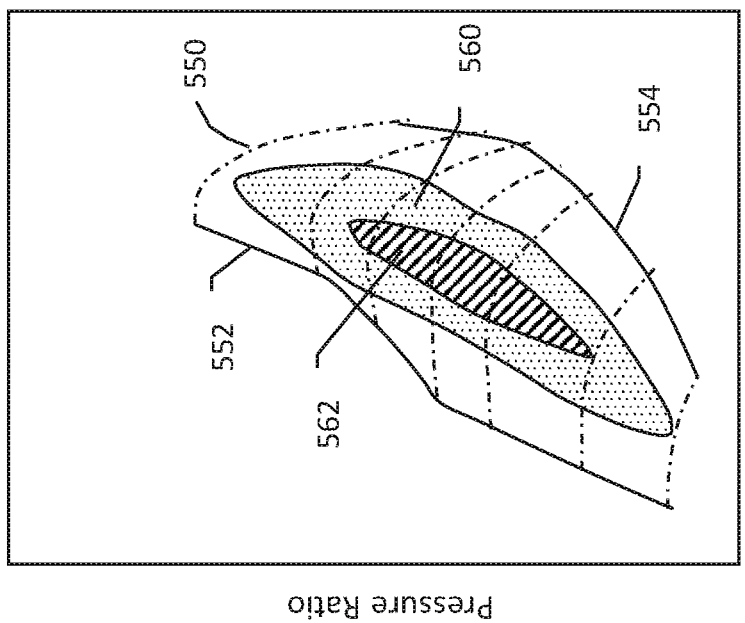
FIG. 7 shows an illustrative compressor map.

In some examples, a target control metric for the system is the boost pressure, which as previously noted, is the pressure at position 16, downstream of the compressor 32. Boost pressure may be determined by calculation using the compressor speed 32 and measured composition, pressure and temperature of air entering the compressor 32 by referencing a model, as well as a compressor map (FIG. 7, below). The model may be determined for a given configuration by measurements taken at a test stand. Extra sensors may be placed throughout the airflow system to establish an air flow model, for example in a test process. To provide a desired level of boost pressure, a combination of control outputs can be used to ensure that the combination of the turbine 34 and the E-Turbo 36 provide a desired power to the compressor 32.

A variety of competing goals and conditions are present. For example, the E-Turbo 36 is not intended, generally, to be used all the time, as it is powered typically by a rechargeable battery, and overuse of the E-Turbo can reduce battery life. Actuation of each valve in the system comes with a cost as well, as each such movement leads to wear, degradation, and eventual need for service and/or replacement. The WG 70 operates in a dirty, high pressure and high temperature environment and therefore is subject to both wear and, over time, particulate accumulation. Sudden changes in turbocharger speed are associated with low cycle fatigue. Moreover, while boost pressure is desirable in terms of engine performance (that is maximizing power), fuel efficiency and environmental (exhaust gas composition for example) concerns also arise. The turbocharger 30 itself has a maximum speed, exceeding which can lead to catastrophic failure of components therein. The compressor map (FIG. 7) defines operational boundaries including the surge line and choke line, based on combinations of mass flow, pressure ratio, and turbocharger speed.

Each of the elements useful to control operation in the system have different degrees of lag and exercise differing levels of actual control. For example, consider the example of closing the throttle and opening the WG 70 to reduce turbocharger speed to avoid surge with the throttle closed. Opening the WG 70 does not immediately reduce turbocharger speed; the rotational inertia of the turbocharger 30 will keep the turbocharger 30 spinning for some period of time, however, closing the throttle has an immediate effect on mass flow. The RCV 50 is provided to allow release of boost pressure quickly even as the WG 70 is opened to reduce turbocharger speed.

Figure 2:
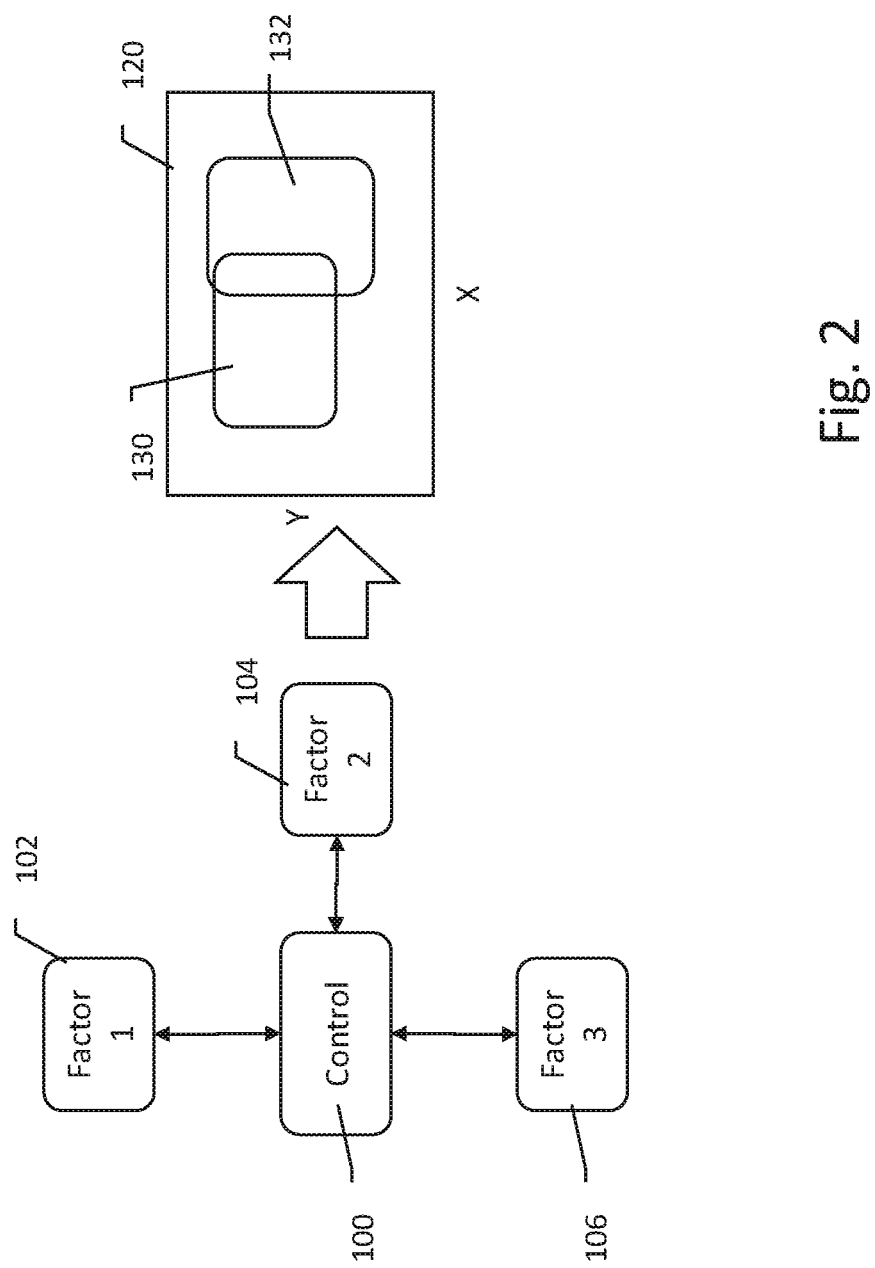
FIG. 2 schematically illustrates a method of system calibration and control.

At a higher level, the airflow system as illustrated in FIG. 1 is not the only system in use. A plurality of systems and system controllers are present, and a variety of features are present each interacting with other features. Moreover, factors within the airflow system are interrelated in complex ways. For example, models defined for a running system may not effectively characterize a cold system. Moreover, a model that is effective within certain boundaries of throttle position, engine speed, and fuel injection parameters may not be effective when operated outside one or more such boundary. FIG. 2 shows an example illustrating the control complexity. A controller 100 must account for multiple controlled factors 102, 104, 106. The system is complex, and a value of one factor 102 may affect how the system performs when controlling another factor 104.

A control system may establish setpoints for operation of each of the factors 102, 104, 106 and use a plurality of proportional-integral-derivative (PID) control calculations to manage each factor by assuming other factors are constant within a relative set of boundary conditions. A PID control configuration operates relative to a setpoint:

$$u(t) = A*e(t) + B*\int_0^T e(t')dt' + C*\frac{de(t)}{dt} \qquad [\text{Eq. 1}]$$

Where coefficients A, B, and C are set in a calibration routine, and control is performed by determining a distance between u(t) and the setpoint. For example, if a controlled output is x, then x may be a function of the difference between u(t) and a desired value for u. With a complex system, the coefficients may turn out to be reliant on one or more other variables in the system.

To avoid complicating the individual controllers, different sets of coefficients may be used for different ranges of operation. For example, as shown in the graphic at 120, using only two factors, X and Y, a mapping of control parameter calibrations can be developed. Each area within the mapping 120 allows operation of a PID controller using calibrated values for each of A, B and C in Equation 1. For example, area 130 may use a first set of values for A, B, and C, and area 132 uses a different set of values for A, B, and C in Equation 1, with the sets of values depending on factors X and Y as shown. To operate the system using the simplified control setup, the overall system controller determines from X and Y which of areas 130, 132 is in use, and writes data values for A, B and C to the appropriate controllers. As X and Y change, the overall system controller determines whether and when to write new data values for A, B and C as operation shifts from range 130 to 132, for example. Determining the boundaries of each area, and effective values for A, B, and C, requires significant time on the test stand during calibration. Adding more and more variables extends the problem.

One proposed enhancement is the use of model predictive control (MPC). With MPC, the distance to target or reference values for the one or more output values (or resulting operating characteristics) is minimized, thus optimizing performance by application of a modelled performance. As an example, an MPC cost function formation may be as shown in Equation 2:

$$J_{MPC} = \min\sum_{k=1}^{P} \|y_{r,k} - y_k\|_Q + \|u_{d,k} - u_k\|_R \qquad [\text{Eq. 2}]$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, Q and R specify weighting terms, and $u_0$ is the last applied control action. The MPC cost function is minimized in operation in order to provide optimal control to the physical plant. MPC is operated within a prediction horizon from k=1 to k=P.

MPC can be implemented to solve a host of non-linear control problems. Some installations, such as in an automobile, truck or other vehicle, however, lack the computing power and memory needed to compute all variables of MPC.

To reduce computation and memory demands, a set of linear MPC controllers are defined, each having an operating range that limits operation to defined boundaries. This again would be similar to FIG. 2, with operational ranges 130, 132 determining which of several sets of calibration values are to be used. Underlying system changes may still require recalibration of the MPC controller. When the system changes fall outside the operating range of one or more of the linear MPC controllers, recalibration of the entire set of linear MPC controllers would then be needed, a time and resource intensive procedure. While MPC may enhance the overall operation, it does not resolve the issue of recalibration as operating conditions change.

Figure 3:
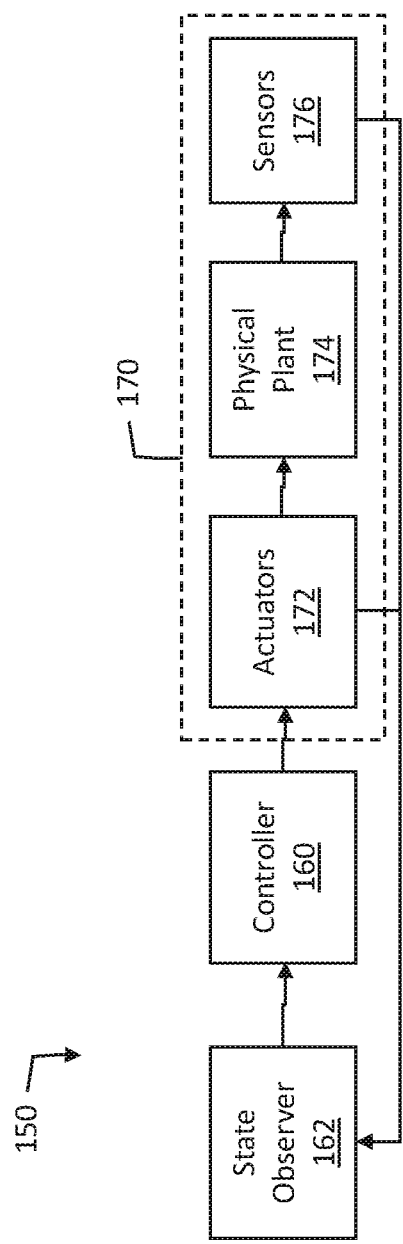
FIG. 3 shows a model of an operational control system.

Before discussing the proposed solution to such challenges, an overall control system configuration will be introduced. FIG. 3 shows a model of an operational control system 150. A control apparatus is shown at 160 and receives information from a state observer 162, which provides a set of current state variables. The controller 160 calculates a solution for process parameters that can be applied to a set of actuators 172, which in turn control operation of the physical plant 174. The set of actuators may control, for example and without limitation, fuel or other injectors, TPCD actuators controlling VGT position or WG position, as the case may be, engine brake, after-treatment (including exhaust), throttle position, low or high pressure EGR, E-Turbo torque, RCV, charge air cooler functions, VIC, and other valves, nozzles, parts and positions in the system.

The physical plant 170 may be, for example and without limitation, an internal combustion engine, whether diesel or gasoline or other fuel. A plurality of sensors 176 are provided. Sensors 176 may include, for example, and without limitation, sensors detecting manifold absolute pressure (MAP), mass air flow (MAF), EGR flow, turbo speed, NOx, engine speed, fuel quantity, UEGO, exhaust temperature, etc. Additional monitored parameters may include, for example, torque output of the electric motor of an electric turbocharger, RCV normalized opening, VIC position and configuration, and/or TPCD position and configuration (whether WG normalized opening, or VGT position and configuration). Sensors 176 may in some examples also sense user inputs, such as pressure on brake or acceleration pedals and/or steering wheel position (and changes to such). Sensors 176 may be configured to sample the underlying parameter being sensed and provide the result of such samples to the state observer 162. The state observer 162 may use the sensor outputs and actuator positions over time to estimate system states.

The state observer 162 and controller 160 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 172 and/or sensors 176, which in turn may be read periodically. The controller 160 may be configured with circuitry, logic, and/or stored instruction sets for performing a control and/or optimization calculation using its programmed scheme for control (i.e. PID or MPC, hybrid, etc.).

The controller 160 may be integrated into, or provided separately from, an on-board diagnostics system (not shown) that can be used to record diagnostic variables and present them, as needed to the user or to store for later analysis. The controller 160 may be linked to or integrated into an overall engine control unit (ECU). Separate blocks 160 and 162 are shown, however, it should be understood that this architecture may be integrated into a single processor or microcontroller, if desired. In other examples, separate ASIC, state machine(s), microcontroller(s) or microprocessors may be provided for each block 160 and 162, as desired.

The control solution calculated by the controller 160 is used to generate one or more outputs, which in turn are used to control the actuators 172 to operate the physical plant 174. Generally speaking the aim may be to minimize the distance of operating variables from one or more target output values for the controllable outputs or physical plant operating characteristics. For example, the targets may be any of target turbocharger speed, target boost pressure, target pressure difference over the compressor, target air mass flow or a combination thereof. Control over the actuators may include, for example and without limitation, opening or closing valves, orifices, etc., or changing a speed of operation (such as by controlling current or voltage supplied to an electric motor), adjusting the geometry of a variable geometry element such as a turbine, adjusting a timing signal such as by changing the timing of fuel injection relative to the motion of a piston in a combustion chamber, changing a temperature at a given location such as by controlling a voltage or current or power level supplied to a heating element, and/or by issuing a control or other signal to any of the features/actuators/valves described above relative to FIG. 1.

In some examples, boost pressure (and various other pressures and temperatures) is "sensed" via a "virtual sensor," that is, it is not directly measured but is instead inferred from a model using other sensed parameters. For example, the state observer 162 may integrate a system model to calculate or infer pressure and temperature at various locations. As discussed above, for example, boost pressure at position 16 (FIG. 1) may be calculated from the system airflow model, using other measured parameters, and accounting for the compressor map and turbocharger speed.

Figure 4:
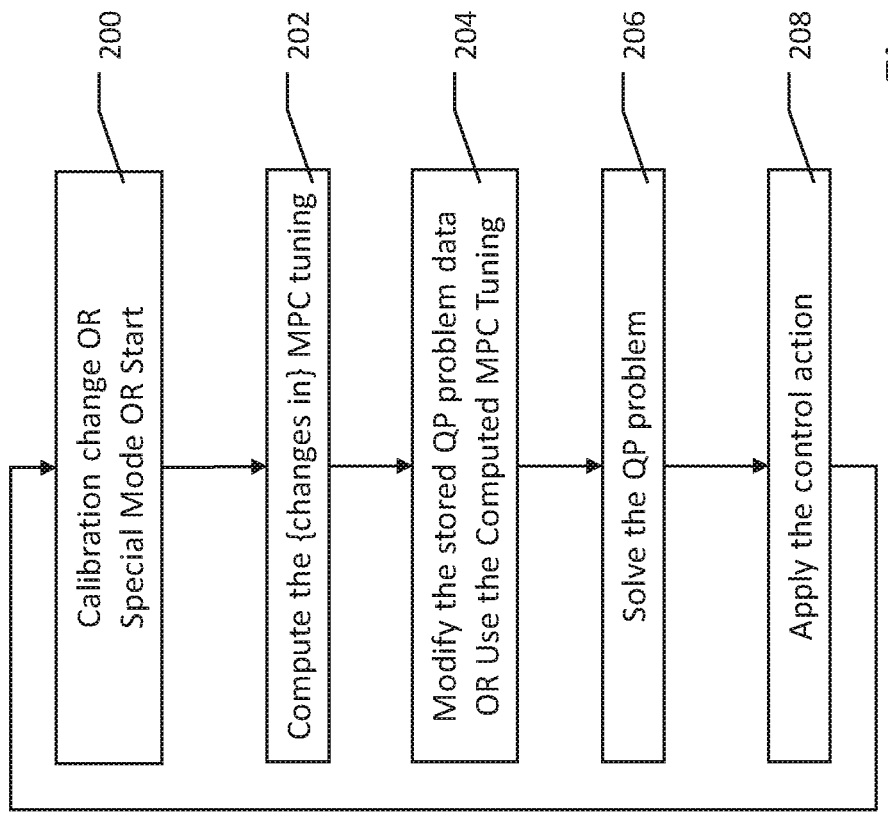
FIGS. 4, 5 and 6A-6C are process flow diagrams for illustrative examples.

FIG. 4 shows in block form an illustrative method example addressing the above identified problem complexity. In this example, rather than regenerating calibrations of a set of linear MPC controllers, the weighting factors used by a linear MPC controller are modified in response to external changes. For example, factors R and S in Equation 2 may be modified. The linear MPC controller can be implemented as a quadratic programming (QP) problem to be solved by a QP solver. As an example, if a linear MPC controller is used to control WG position, applicable for a first range of engine speeds, rather than regenerating the linear MPC controller for the TPCD (WG or VGT) when the engine speed is not within the defined boundary, the weighting coefficient or other factors within the linear MPC controller are modified. In another example, a special low temperature mode may be defined for cold operation, where a sensed exhaust temperature is used to determine whether the special low temperature mode is implemented, and, again, weighting factors such as factors R and S in Equation 2 are manipulated.

In one example, the method begins with the system already operating using control parameters generated by an MPC controller using a set of inputs. When a calibration change occurs (such as a change of EGR position or RCV opening), as indicated at 200, changes in MPC tuning are then computed, as indicated at 202, and those changes are used to modify the stored QP problem data, as indicated at 204. Such changes to MPC tuning can be pre-programmed by storing a lookup table, for example, where the look-up table associates tuning variables (factors Q, S and R in Equation 2 for example) with sensed variable values. In some examples, the calibration change may be identified by reference to the derivative of torque or engine speed as well as or separate from other factors such as EGR position or RCV opening, etc. The updated QP problem is then solved, as indicated at 206. The resulting control action is then applied, as indicated at 208 to, for example, issue a new command to a valve position (WG, VGT, or VIC, for example) or torque output (E-Turbo, for example).

In another example, the method begins with the system determining whether a special mode of operation is needed, as indicated at 200. A special mode of operation may be determined using reference to environment of the system such as a detection of low temperature in the exhaust after treatment system. Other special mode triggers may be associated with, for example and without limitation, sensed power load, sensed ambient or exhaust pressure, etc. The appropriate MPC tuning is then called, as indicated at 202, such as by use of a look-up table. The brackets in block 202 indicate that the values of MPC tuning may be initially called by the method, and/or may be modified iteratively during operation, as desired. The computed MPC tuning from block 202 is then implemented via the QP problem data 204. The QP problem is then solved, as indicated at 206. The resulting control action is then applied, as indicated at 208 to, for example, issue a command to a valve position (WG, VGT, or VIC, for example) or torque output (E-Turbo, for example). From FIG. 4 it should be understood that the use of special mode operations may be implemented at a cold start, for example, allowing the special mode (from cold start) to rely on MPC specifically configured for the circumstances. As the system operates, the cold start special mode may terminate. In some examples, termination of the cold start special mode may take place at a define interval from initiation. In other examples, termination of the cold start special mode may be responsive to sensed conditions, such as sensed temperature or MAP in the engine intake manifold or at the exhaust.

Figure 5:
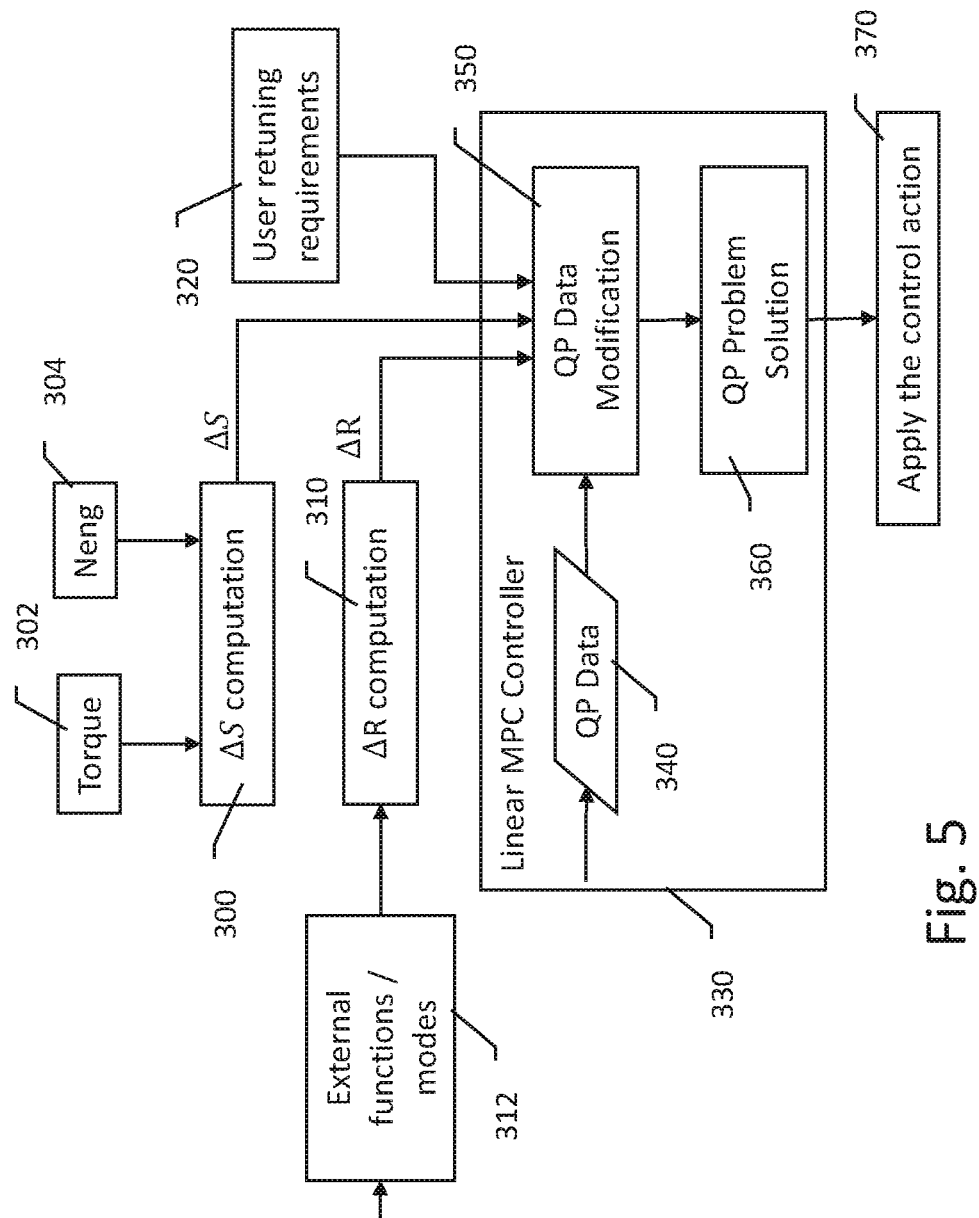

FIG. 5 illustrates another example, this time specific to the turbocharger control solution discussed above. In this approach, different change sources are identified and treated separately as inputs to the QP problem data updating procedure. A first computation 300 for a first factor, $\Delta S$, accounts for higher attraction to manipulated feedforwards during heavy transients in the desired engine torque 302 and/or engine speed 304, for example. As a result, the weighting matrix for S in equation 2 can be modified in block 350, below, to $S = S_0 + \Delta S$.

A second computation 310 for a second factor, $\Delta R$, takes into account the presence of external functions or modes, such as a special mode for cold start of an engine, as indicated at 312. As also noted at 350, a modification in the speed of the control action is represented by R; in the special modes, $R = R_0 + \Delta R$, for example, to modify the speed of control actions taking effect. User tuning requirements, such as user-selected, desired operation of the wastegate or desired torque from the E-Turbo, are also integrated, as indicated at 320. The linear MPC controller 330, starting with existing QP data 340, applies a QP data modification, as indicated at 350. The QP problem solution is then determined at 360, and a control action is applied as indicated at 370.

For example, the MPC formulation may be configured to use predictions set in a matrix format, such as:

$$\begin{bmatrix} y_k \\ y_{k+1} \\ y_{k+2} \\ \vdots \\ y_{k+N-1} \end{bmatrix} = \begin{bmatrix} C \\ CA \\ CA^2 \\ \vdots \\ CA^{N-1} \end{bmatrix} x_k + $$

$$\begin{bmatrix} D & & & & \\ CB & D & & & \\ CAB & CB & D & & \\ \vdots & \vdots & \ddots & \ddots & \\ CA^{N-2}B & CA^{N-3}B & \cdots & \cdots & D \end{bmatrix} \begin{bmatrix} u_k \\ u_{k+1} \\ u_{k+2} \\ \vdots \\ u_{k+N-1} \end{bmatrix} = Cx_k + \mathcal{D}U$$

[Eq. 3]

Further wherein the definition of the change in control parameter u is in the form of:

$$\Delta u_k = u_k - u_{k-1}$$ [Eq. 4]

And:

$$\begin{bmatrix} \Delta u_0 \\ \Delta u_1 \\ \Delta u_2 \\ \vdots \\ \Delta u_{N-1} \end{bmatrix} = \begin{bmatrix} I_{n_u} & & & & \\ -I_{n_u} & I_{n_u} & & & \\ & -I_{n_u} & I_{n_u} & & \\ & & \ddots & \ddots & \\ & & & -I_{n_u} & I_{n_u} \end{bmatrix} \begin{bmatrix} u_0 \\ u_1 \\ u_2 \\ \vdots \\ u_{N-1} \end{bmatrix} + \begin{bmatrix} -I_{n_u} \\ 0 \\ 0 \\ 0 \\ 0 \end{bmatrix} u_{k-1} = $$

[Eq. 5]

$$KU + Mu_{k-1}$$

The optimization vector may then be defined as:

$$U = [u_0^T, u_1^T, \ldots, u_{N-1}^T]$$ [Eq. 6]

The QP problem to be solved then is defined as:

$$J^* = \min^2 \frac{1}{2} U^T H U + p^T F U$$ [Eq. 7]
$$\text{s.t. } \underline{U} \leq U \leq \overline{U}$$

Thus values for U are bounded. Within Eq. 7, illustratively, p, H and F may be:

$$p = [x_0^T, r^T, u_{t-1}^T, u^{FF}]$$ [Eq. 8]

$$H = \mathcal{D}^T Q \mathcal{D} + K^T (\mathcal{R} + \Delta \mathcal{R}) K + S + \Delta S$$ [Eq. 9]

$$F = \begin{bmatrix} \begin{bmatrix} C^T \\ -1_{N-1}^T \otimes I_{n_y} \end{bmatrix} Q \mathcal{D} \\ M^T (\mathcal{R} + \Delta \mathcal{R}) K \\ -1_{N-1}^T \otimes (S + \Delta S) \end{bmatrix}$$ [Eq. 10]

The illustrative equations 3, 8, 9 and 10 show that, for specific calibrations weights of Q, R, and S, the construction of the matrices H and F may require significant computing power and memory. To avoid burdening for example a vehicle ECU, the present inventor instead seeks to perform the design of the MPC offline, using nominal tuning for Q, R and S, while also storing in memory the related matrices H and F. The online stage of controller execution can then modify matrices H and F using the calibration terms $\Delta R$ and $\Delta S$ as outlined above, having only negligible effects on CPU usage and memory demands.

Here, the functions defined above for $\Delta S$ and $\Delta R$ are thus integrated into the QP problem, and can be adjusted in response to identified calibration changes and special states. The variables R and S can be determined as follows:

$$\mathcal{R}=I_N\otimes R, \Delta\mathcal{R}=I_N\otimes \Delta R$$

$$Q=I_N\otimes Q$$

$$\mathcal{S}=I_N\otimes S, \Delta\mathcal{S}=I_N\otimes \Delta S \qquad \text{[Eq. 11]}$$

While the bounds for U are determined by:

$$\underline{U}=1_N\otimes \underline{u}$$

$$\overline{U}=1_N\otimes \overline{u} \qquad \text{[Eq. 12]}$$

In this formulation, ΔS modifies the feedforward tracking weight and, as can be seen in Equations 9 and 10, the updated functions for H and F are modified by simple addition, keeping complexity at a minimum. To further minimize complexity, each of S, ΔS, R and ΔR are defined as diagonal matrices. The matrices M and K are defined sparsely within a defined structure as well.

The Hessian matrix at 350 can then be updated in associated with a change generated using the ΔS input:

$$H[i,i]=H[i,i]+\Delta\mathcal{S}[i,i] \text{ for } i=1,\ldots Nn_u \qquad \text{[Eq. 13]}$$

The linear part of the cost function is then defined, again using ΔS:

$$F_S=-1_{N\cdot1}{}^T\otimes(S+\Delta S) \qquad \text{[Eq. 14]}$$

As defined by Equation 14, only the linear part of F is modified by the calibration terms—that is, the upper two terms (the non-linear part of cost function F) in Equation 10 remain unchanged with the update shown in Equation 14, in some examples. Updating can be performed with a limited quantity of floating-point operations, minimizing the computational demand with a nested loop as follows:

For i=1:nu, $$tmp=F_S[i,i]-\Delta S(i,i);$$

For j=1:N, $$F_S[i,(j-1)*n_u+1]=tmp;$$

End
End

Where N is the prediction horizon, and N_u is the number of manipulated variables (in some examples, the weighting factors of the MPC calculation). The transformed and updated Hessian is then:

$$H=\mathcal{D}^T Q\mathcal{D}+K^T(\mathcal{R}+\Delta\mathcal{R})K+\mathcal{S}+\Delta\mathcal{S} \qquad \text{[Eq. 15]}$$

For an update from ΔR, the Hessian is updated using $K^T(\mathcal{R}+\Delta\mathcal{R})K$. The structure of K may be defined as:

$$\begin{matrix} 2(R+\Delta R) & -(R+\Delta R) & & & \\ -(R+\Delta R) & 2(R+\Delta R) & \ddots & & \\ & \ddots & \ddots & \ddots & \\ & & \ddots & 2(R+\Delta R) & -(R+\Delta R) \\ & & & -(R+\Delta R) & (R+\Delta R) \end{matrix} \qquad \text{[Eq. 16]}$$

Hence updating the Hessian with $\Delta\mathcal{R}$ is to sum the elements of the Hessian as depicted in Equation 16. Based on the structure of $M(\mathcal{R}+\Delta\mathcal{R})K$, within F:

$$[-(R+\Delta R)0\ldots 0] \qquad \text{[Eq. 17]}$$

As a result, the linear part of the cost function F can be easily modified by changing only the first block component. Each input to Equation 10 is described using Equations 11-17.

Figure 6A:
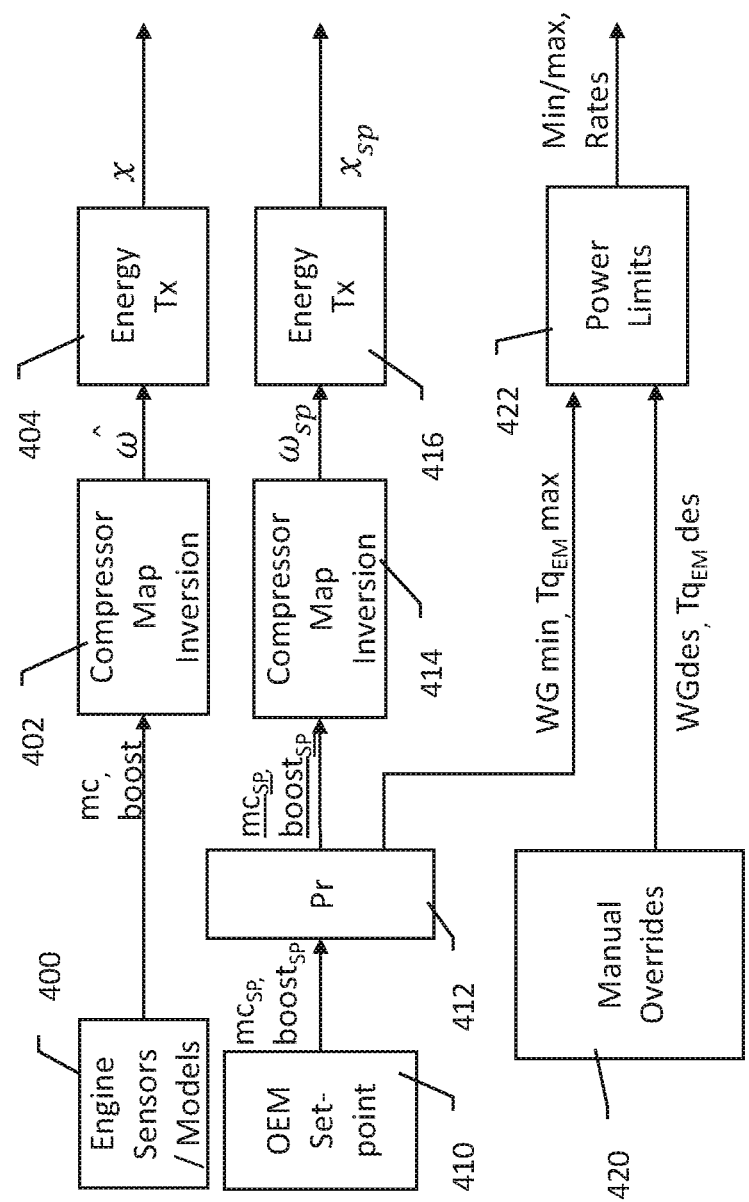
Figure 6B:
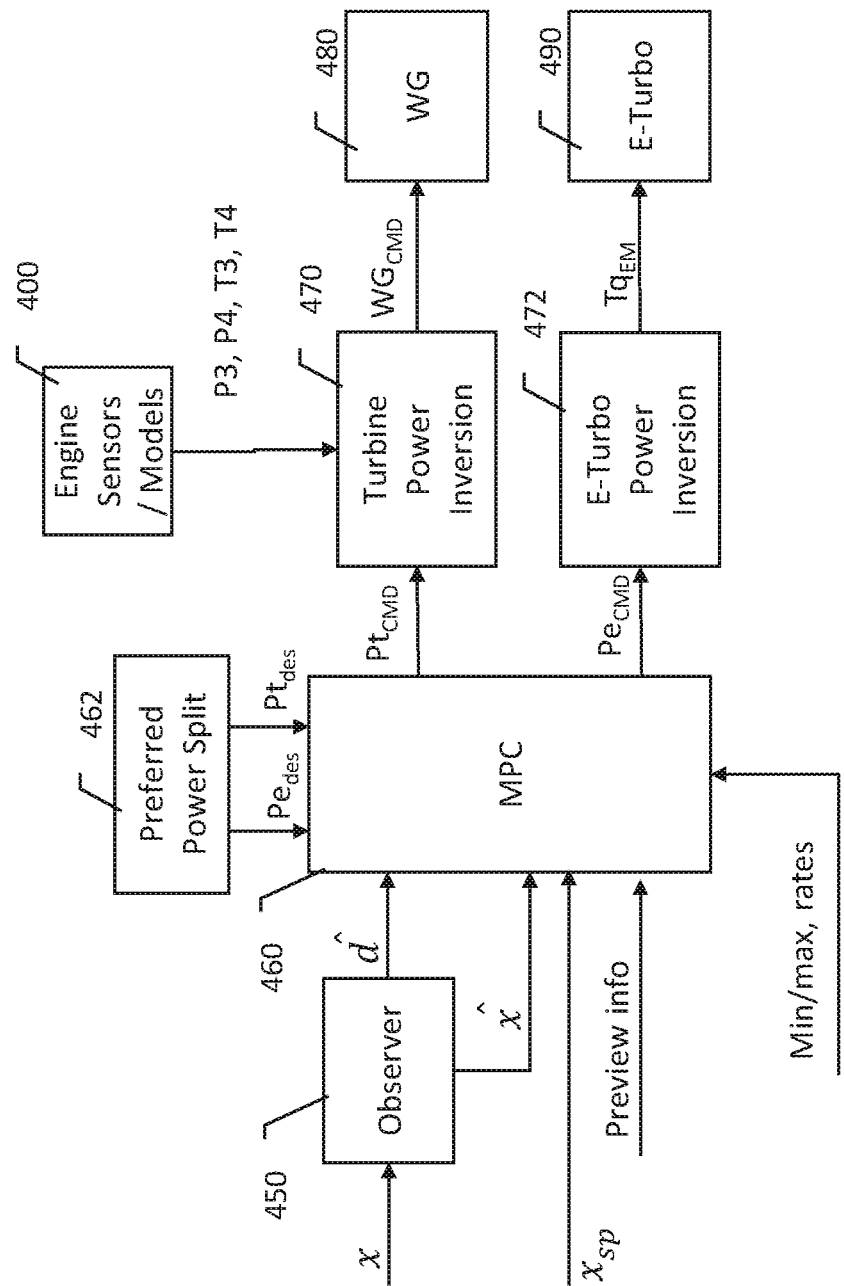
Figure 6C:
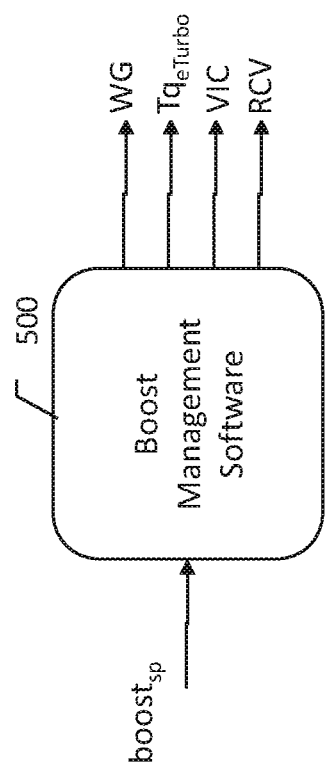

FIGS. 6A-6C are process flow diagrams for illustrative examples. In this example, the model is converted to a linear form by non-linear inversion from the use of pressure metrics/signals to kinetic energy of the turbocharger. Next, a linear MPC can be applied to the actuators using the power domain. Finally, a non-linear transformation is performed to obtain resultant actuator positions and control signals.

Starting with FIGS. 6A-6B, in FIG. 6A engine sensors and models (such as the airflow model) are used to calculate existing mass flow in the compressor (mc) and boost pressure (boost), which is provided to a compressor map inversion 402 to estimate compressor speed (ω). The compressor speed $\hat{\omega}$ passes to an energy conversion, calculating the energy that the compressor is providing to the air passing therethrough (x). The operational setpoint is calculated in parallel, starting with a setpoint such as the setpoint provided by the original equipment manufacturer (OEM). Thus the setpoints for mc and boost are provided by block 410 to a protection manipulation block 412, which determines whether any protections are needed (surge, over-boost, over-speed, E-Turbo temperature), and modifies the setpoint as needed to prevent violating any protective parameter. The output of Pr block 412 will then be a bounded compressor mass flow and boost pressure setpoints, provided to a compressor map inversion 414 to yield the compressor speed setpoint $\omega_{SP}$, which is converted at 416 to the setpoint energy to be provided by the compressor, $x_{sp}$. Blocks 402 and 414 in the example would be derived from the compressor map itself (FIG. 7).

Blocks 404 and 416 rely on the basic transformation of compressor speed to turbocharger energy, using the power balance on the turbocharger shaft:

$$\frac{d\omega}{dt}=\frac{1}{J}\left(T_e+\frac{P_t}{\omega}-\frac{P_c}{\omega}-M_{fric}\right) \qquad \text{[Eq. 18]}$$

Where ω is the turbocharger speed, J is the turbocharger shaft inertia, $P_t$ is power obtained at the turbine from the exhaust airstream, $P_c$ is power applied by the compressor to the airflow through the compressor, $T_e$ is the e-Turbo torque, and $M_{fric}$ is the frictional loss inside the turbocharger. Transforming Equation 18 to the kinetic energy balance:

$$J\omega\frac{d\omega}{dt}=\omega T_e+P_t-P_c-\omega M_{fric} \qquad \text{[Eq. 19]}$$

Substituting the energy ($x=0.5\ J\omega^2$) provides the outputs from blocks 404 and 416. The power balance is then defined (neglecting friction losses inside the turbocharger) by Equation 20:

$$\frac{dx}{dt}=P_e+P_t-P_c \qquad \text{[Eq. 20]}$$

The protection block also operates to drive power limits block 422, along with any applied manual overrides at 420. Thus the minimum wastegate opening ($WG_{min}$) and maximum E-Turbo torque, ($Tq_{EMmax}$) are provided as power limits to 422. The manual overrides may include the desired wastegate position ($WG_{des}$) and desired E-Turbo torque ($Tq_{EMdes}$) for example. The power limits block 422 can then determine using the applied inputs what maximum, minimum, or rate limits are to apply. In some examples, the desired E-Turbo torque would be zero, indicating that the aim is to limit E-Turbo usage to situations where response cannot be obtained using the turbine power.

FIG. 6B shows how the calculations of FIG. 6A can then be applied. The system defines an observer at 450, which may be, for example, a Kalman filter, to in turn provide an estimate of the compressor energy x̂, as well as an estimated disturbance d to the MPC 460. In addition, the compressor energy setpoint $x_{sp}$ is used by the MPC. The applicable power limits are also integrated into the MPC 460. Finally, the preferred power split 462 is brought into the equation for the MPC. Here, again, the end result in some examples will be a preferred power split that obtains no power from the E-Turbo and only uses power from the turbine to drive the compressor, however, in special or transient circumstances the E-Turbo share of the power split may be non-zero.

The MPC 460 provides two outputs, a commanded power from the turbine, and a commanded power from the E-Turbo. The turbine commanded power is subject to inversion 470 using the turbine map as well as inputs from engine sensors and models 400, including in this example, P3 and T3, which would be the pressure and temperature, respectively, of air flow into the turbine, and P4 and T4, which would be the pressure and temperature, respectively, of air flow out of the turbine, each of which would be obtained from a model that references sensed pressure and temperature at other positions in the air flow model. Commanded wastegate position results from the turbine power inversion and the air flow model, as indicated at 480, and the commanded torque from the E-Turbo results from the E-Turbo power inversion, as indicated at 490.

Various alternatives can be defined here. For example, a configuration using a VGT may generate a control signal at 470, 480 for the VGT, rather than the WG. In some examples, a VIC may be controlled as well, and such control can be integrated in the method as a further variable in the compressor map inversion and as part of the compressor modelling used to determine the boost pressure given other variables (input air conditions and turbocharger speed).

FIG. 6C summarizes the overall analysis, showing that a boost setpoint is entered to the boost management software 500, which will have access to the system airflow model and sensor outputs. The resulting control signals are then provided to the WG, E-Turbo torque, VIC, and RCV, as calculated by the MPC. The boost management software 500 may be stored in an on-board memory as a computer or controller executable instruction set configured to perform methods as illustrated herein. For example, the stored instructions of software 500 may perform steps such as, for example and without limitation, those for performing an illustrative method of operating a system. The method may comprise applying an MPC calculation to determine control metrics for one or more operable devices in the system, determining a change in an input to the system, modifying one or more coefficients of the MPC calculation in response to the change in the input to the system; and re-applying the MPC calculation using the modified coefficients and issuing control commands to the one or more operable devices in the system therefrom. In some examples, the MPC calculation may not be performed until after selection of one or more coefficients of the MPC calculation, that is, at a start-up of the method, rather than as an operation of an ongoing method.

The MPC calculation may use, for example, a formula as illustrated above in Equation 2 to determine a cost calculation within a time horizon to identify control parameter that minimize the cost during the time horizon. Illustratively, the control signals to be generated are determined, for example, by calculating an MPC control solution for the parameters under analysis in the MPC, as illustrated in FIGS. 4, 5 and/or 6A-6B. The control solution is then converted to control signals by the use of one or more transformations that may include inverting a power or energy control target to determine target speed, torque, airflow, etc., as illustrated in FIGS. 6A-6B and in the formulae shown above. The target speed, torque and/or airflow characteristics can be used further to determine positions for various actuators such as the EGR or RCV valves, VIC, VGT, EGR, etc. In the example of FIG. 6C, the output control signals are indicated as WG, E-Turbo torque, VIC, and RCV; such a combination may be used in some examples, while other examples may issue control signals to more, fewer, or different parts of the system.

Some examples may take the form of a microprocessor, central processing unit, microcontroller, or state machine, having associated therewith a stored instruction set on a tangible readable medium for execution of the noted boost management software 500. For example, an ECU in a vehicle (air, land or sea) may include a microprocessor or microcontroller and a machine readable, tangible medium (RAM, ROM, Flash, or other memory) on which such readable instructions and instructions sets are stored. The memory may further store such data, including look-up tables, for example, as would be useful to perform the methods disclosed herein.

FIG. 7 shows an illustrative compressor map. The compressor map uses corrected mass air flow as the X-axis, and the pressure ratio of the compressor as the Y-axis (that is, pressure out divided by pressure in). Several turbocharger speed lines 550 cross the graph and are associated with different compressor speeds. Boundary conditions are included, with a surge line 552 on the left side of the drawing, and a choke line 554 on the right side of the drawing. The surge line 552 indicates the maximum pressure the turbocharger can generate at a given mass flow. The choke line 554 indicates the maximum amount of mass air flow at a given pressure ratio. Operation outside of these boundaries 152, 154 is avoided to prevent degraded (and unpredictable) operation as well as potential damage to components.

The efficiency of a turbocharger reflects the ability to compress the air without adding excessive heat. The higher the efficiency, the cooler the outlet temperature for a given boost pressure (though still exceeding ambient temperature). Efficiency islands are shown in the graphic at 560 and 562, with each "island" defining combinations of factors resulting in improved efficiency. For example, operating inside the boundary 560 may correlate to efficiency at or above 65%, and inside island 562 may correlate to an efficiency of 75% or higher.

For a given turbocharger installation, testing can be performed at a test stand to establish the compressor map, and the ECU is then loaded with data representative of the compressor map. Factors for use in control are then derived using the compressor map and other system characteristics, as well as, at least in some examples, user preferences. For example, in the above method examples, the compressor map inversion is used (blocks 402, 414 in FIG. 6A, for example). At a given boost pressure, and knowing from ambient sensors and the model the compressor inlet pressure, the pressure ratio (Y-axis) is known, and using a mass air flow (MAF) sensor in the intake and/or a model for mass air flow, the corrected mass air flow can be determined. The desired compressor speed can then be determined.

The compressor map in FIG. 7 is simplified; an actual compressor map may include more lines to provide greater granularity. In use the compressor map as shown would be converted to data and stored by the ECU. The turbine likewise is typically modeled and mapped to generate a turbine map, typically using mass flow and pressure ratio as the axes (though often displayed as the inverse, with corrected mass flow as the Y-axis and pressure ratio along the X-axis).

Figure 8:
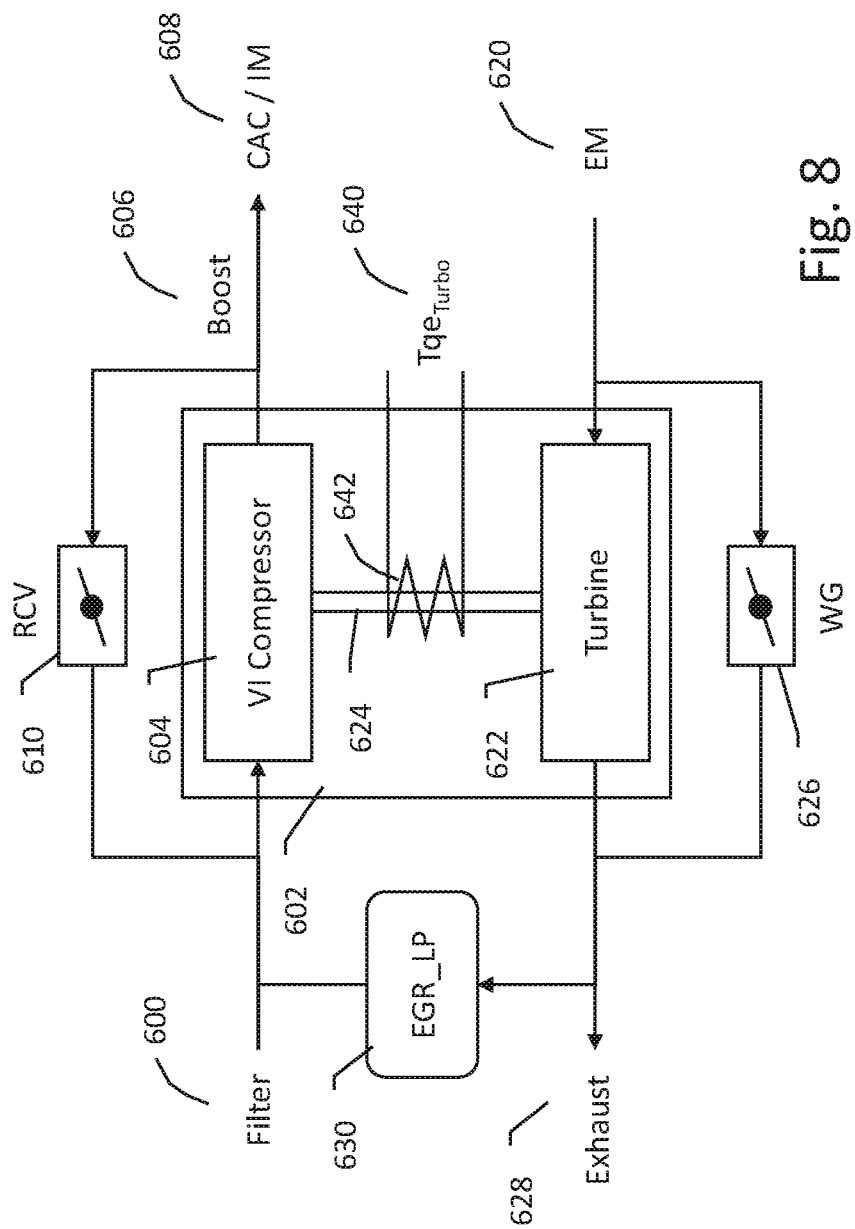
FIG. 8 schematically shows a portion of the airflow associated with an electrically augmented turbocharger.

FIG. 8 schematically shows a portion of the airflow associated with an electrically augmented turbocharger. Incoming airflow passes through an air filter 600, through an MAF sensor (not shown) if desired, and to the turbocharger 602, where it is compressed by a compressor 604 which may be, as indicated, a variable intake compressor (VIC). The output is at a boost pressure 606, and passes through a charge air cooler (CAC) to the engine intake manifold 608. After combustion in the engine, exhaust air flows from the exhaust manifold 620 to the turbine 622, which in turn spins the compressor 604 via drive shaft 624. A wastegate (WG) is provided in parallel with the turbine 622 and allows exhaust gas to selectively bypass the turbine 622, providing control over the power delivered to the turbine. A VGT may be used instead of the WG; either component may be described as a turbine power control device (TPCD). Further control is generated by the inclusion of the E-Turbo 640, which delivers torque via electromagnetic coupling 642 to the drive shaft 642. The output air from the turbine 622 and/or WG 626 passes to the exhaust, where it may receive various aftertreatments (filters, traps, and converters, for example, which will vary depending on the fuel type of the engine).

Thus far the description omits a low-pressure exhaust gas recirculation (EGR_LP) component 630, as well as the recirculation valve (RCV) 610. In an illustrative example, the system may use an MPC controller with selected weights and calibration constants to control the system, treating the RCV 610 and EGR_LP 630 as having fixed positions, for example, fully closed for the RCV 610 and partly open at some specified setting for the EGR_LP 630. Doing so simplifies the MPC controller configuration.

In an example, when a change is made, for example, to the EGR_LP 630 position, such as if the EGR_LP is opened to a greater degree in response to identified engine knock, this would adversely affect the MPC controller calculations and cause suboptimal operation. Rather than reconfiguring and recalibrating the MPC controller in its entirety, one or more weighting factors in the MPC controller are adjusted. A change in position of the VIC of the compressor 604 may be handled similarly to a change in the EGR_LP. In some illustrative examples, changes to EGR valve (whether low pressure or high pressure) and/or VIC position would be sources that impact the $\Delta R$ input, causing a change in the speed of changes of other factors.

In some examples, changes to the RCV 610 are treated differently than those to the EGR_LP 630. This may be because RCV 610 changes can be expected to be short term changes; if the RCV 610 is opened, the cause may be a closing of the throttle, indicating a reduction in needed power and boost. Such a change will only apply for a short period of time before the RCV 610 would again be closed, thus a change that indicates greater feedforward may be implemented. Hence $\Delta S$ is affected, as described above.

User inputs, including changes to the power demand on the engine and/or the engine speed may each also be treated similarly to the ongoing operational changes affecting $\Delta R$. For example, at higher engine speeds and/or higher torque demands on the engine, faster responsiveness of the airflow control system may be implemented, while responsiveness can be slower at lower engine speeds and/or torque demands.

Therefore, in several examples, different categories of changes are understood as occurring. For example, automated changes to feedforward attraction result, in an illustrative example, from changes to RCV position, identification of out of range (low) temperature in the exhaust 628 and/or low pressure in the IM 608. Automated changes to the MPC formulation are applied, instead, when there are changes to engine speed, torque demand on the engine, VIC and/or position of EGR valve, to increase or decrease responsiveness of the MPC formulation.

It should also be understood that certain examples split up the various functions into smaller control programs. For example, a system may use separate linear MPC formulations to control, for example, VIC position separately from controlling WG position. If the calculation used to control VIC position changes the VIC position, the system may be configured to then adjust the responsiveness of some other control strategy. For example, responsive to a change in VIC position the coefficients used in an MPC calculation controlling WG position can be modified to adjust responsiveness, for example.

In another approach, extremum positions can be identified and used to adjust feedforward or responsiveness, as the case may be. For example, at a given VIC position, the control strategy may eventually reach a condition whether the WG is fully closed, maximizing power to the turbine. When the WG reaches its full closed position, the controller may modify the responsiveness of the VIC control formula, as a means of recognizing the further increase in boost pressure by manipulation of the WG cannot be achieved. If E-Turbo is present, responsiveness of the E-Turbo torque output may be modified (increased, for example) when the WG reaches an extremum position. Other combinations may be used. Thus, as formulated herein, a special mode or system input change may also be triggered by the system controller identifying that one or more actuators, valves, etc. have reached an extremum position.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. The terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A method of operating a system comprising:
   applying a model predictive control (MPC) calculation to determine control metrics for one or more operable devices in the system;
   determining a change in an input to the system;
   modifying one or more coefficients of the MPC calculation in response to the change in the input to the system; and
   re-applying the MPC calculation using the modified coefficients and issuing control commands to the one or more operable devices in the system therefrom.

2. The method of claim 1 wherein the step of modifying one or more coefficients of the MPC calculation in response to the change in the input to the system excludes reconstructing the MPC itself.

3. The method of claim 2 wherein the MPC calculation uses a Hessian matrix and a cost function, and step of modifying one or more coefficients of the MPC calculation in response to the change in the input to the system is performed by modifying only the Hessian matrix and the coefficients of the cost function.

4. The method of claim 3 wherein the cost function comprises a non-linear part and a linear part, and the step of modifying the coefficients of the cost function is performed by modifying only the coefficients of the linear part of the cost function.

5. The method of claim 1 wherein the MPC calculation is formulated off-line, while the applying, determining, modifying and re-applying steps are performed on-line as the system is operating.

6. The method of claim 1 wherein the system is an engine having an airflow system, comprising:
   an engine having an intake manifold and an exhaust manifold;
   a turbocharger having a compressor for compressing air entering the intake manifold using at least power obtained from exhaust gasses exiting the exhaust manifold;
   a turbocharger power control device (TPCD) configured to manipulate power delivered by the exhaust gasses to the turbocharger; and
   an E-Turbo motor configured to selectively apply torque to the turbocharger;
   wherein the control metrics are applied to control position of the TPCD, and the amount of torque applied by the E-Turbo motor.

7. The method of claim 6 wherein the system comprises a recirculation valve (RCV) to allow recirculation of compressed air from the compressor to the compressor intake; and the step of determining a change in an input to the system comprises identifying a change in RCV position.

8. The method of claim 6 wherein the compressor is a variable intake compressor (VIC), and the step of determining a change in an input to the system comprises identifying a change in VIC position.

9. The method of claim 6 wherein the system comprises an exhaust temperature sensor, and the step of determining a change in an input to the system comprises identifying a change in exhaust temperature.

10. The method of claim 6 wherein the system is configured to determine current engine speed and an engine speed command, and the step of determining a change in an input to the system comprises identifying a difference between the current engine speed and the engine speed command.

11. The method of claim 6 wherein the MPC calculation is performed in a power domain by:
    taking as an input a desired boost pressure;
    converting the desired boost pressure to a desired turbocharger speed, and then to desired kinetic energy of the turbocharger; and
    determining from the desired kinetic energy of the turbocharger a desired exhaust gas power and a desired E-Turbo torque.

12. The method of claim 6, wherein:
    the system comprises a recirculation valve (RCV) to allow recirculation of compressed air from the compressor to the compressor intake;
    the compressor is a variable intake compressor (VIC); and
    the MPC calculation is performed in a power domain by:
    taking as an input a desired boost pressure;
    converting the desired boost pressure to a desired turbocharger speed, and then to desired kinetic energy of the turbocharger; and
    determining from the desired kinetic energy of the turbocharger each of:
    a desired exhaust gas power;
    a desired E-Turbo torque;
    a desired RCV position; and
    a desired VIC position.

13. The method of claim 12, wherein modifying one or more coefficients of the MPC calculation in response to the change in the input to the system comprises:
applying a first coefficient to adjust feedforward attraction of the MPC calculation; and
applying a second coefficient to adjust a rate of change of the control metrics for the TPCD, the E-Turbo torque, the RCV position, and the VIC position.

14. A method of operating a system comprising:
in an off-line mode, calculating a model predictive control calculation for operation of the system;
in an on-line mode:
applying the MPC calculation to determine control metrics for one or more operable devices in the system by use of at least one first coefficient affecting a feedforward attraction of the MPC calculation;
determining a change in an input to the system;
modifying the at least one first coefficient in response to the change in the input to the system; and
re-applying the MPC calculation using the modified at least one first coefficient and issuing control commands to the one or more operable devices in the system therefrom.

15. The method of claim 14 wherein the on-line mode modifies the at least one first coefficient without recalculating the MPC calculation.

16. The method of claim 14 wherein the system is an engine having an airflow system, comprising:
an engine having an intake manifold and an exhaust manifold;
a turbocharger having a compressor for compressing air entering the intake manifold using at least power obtained from exhaust gasses exiting the exhaust manifold;
a turbocharger power control device (TPCD) configured to manipulate power delivered by the exhaust gasses to the turbocharger; and
an E-Turbo motor configured to selectively apply torque to the turbocharger;
wherein the control metrics are applied to control position of the TPCD, and the amount of torque applied by the E-Turbo motor.

17. The method of claim 16 wherein the system further comprises a recirculation valve (RCV), and the step of determining a change in an input to the system comprises identifying a change in RCV position.

18. The method of claim 16 wherein the system comprises an exhaust gas temperature sensor and the controller defines a normal range of exhaust gas temperatures, and the step of determining a change in an input to the system comprises identifying an indication of out of normal range exhaust gas temperature.

19. The method of claim 16 wherein the system includes an intake manifold pressure sensor and the controller defines a normal range of intake manifold pressures, and the step of determining a change in an input to the system comprises identifying an out-of-normal range intake manifold pressure.

20. A method of operating a system comprising:
applying a model predictive control (MPC) calculation to determine control metrics for one or more operable devices in the system by use of at least one first coefficient affecting a speed of responsiveness of the MPC;
determining a change in an input to the system;
modifying the at least one first coefficient in response to the change in the input to the system; and
re-applying the MPC calculation using the modified at least one first coefficient and issuing control commands to the one or more operable devices in the system therefrom;
wherein the system is an engine having an airflow system, comprising:
an engine having an intake manifold and an exhaust manifold;
a turbocharger having a compressor for compressing air entering the intake manifold using at least power obtained from exhaust gasses exiting the exhaust manifold;
a turbocharger power control device (TPCD) configured to manipulate power delivered by the exhaust gasses to the turbocharger; and
an E-Turbo motor configured to selectively apply torque to the turbocharger;
and wherein the control metrics are applied to control position of the TPCD, and the amount of torque applied by the E-Turbo motor.

* * * * *